US008397243B2

(12) United States Patent
Isoyama

(10) Patent No.: US 8,397,243 B2
(45) Date of Patent: Mar. 12, 2013

(54) ON-VEHICLE RELAY CONNECTION UNIT

(75) Inventor: Yoshikazu Isoyama, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 304 days.

(21) Appl. No.: 12/864,327

(22) PCT Filed: Feb. 26, 2009

(86) PCT No.: PCT/JP2009/053545
§ 371 (c)(1),
(2), (4) Date: Jul. 23, 2010

(87) PCT Pub. No.: WO2009/107713
PCT Pub. Date: Sep. 3, 2009

(65) Prior Publication Data
US 2010/0325639 A1    Dec. 23, 2010

(30) Foreign Application Priority Data

Feb. 26, 2008  (JP) ................................ 2008-043868
Feb. 26, 2008  (JP) ................................ 2008-043869

(51) Int. Cl.
*G06F 9/44*  (2006.01)
*G06F 15/17*  (2006.01)
(52) U.S. Cl. ...................................................... 719/313
(58) Field of Classification Search ................... 719/313
See application file for complete search history.

(56) References Cited

U.S. PATENT DOCUMENTS

2007/0130265 A1* 6/2007 Yano et al. ..................... 709/206
2007/0274328 A1* 11/2007 Sonoda et al. ................. 370/401

FOREIGN PATENT DOCUMENTS

| DE | 199 29 608 C2 | 8/2002 |
| JP | A-8-161244 | 6/1996 |
| JP | A-10-112737 | 4/1998 |
| JP | A-2006-340099 | 12/2006 |
| JP | A-2007-36907 | 2/2007 |

OTHER PUBLICATIONS

International Search Report mailed Apr. 21, 2009 issued in International Patent Application No. PCT/JP2009/053545 (with translation).
Mar. 26, 2012 German Office Action issued in German Patent Application No. 11 2009 000 409.1 (with translation).

* cited by examiner

*Primary Examiner* — Andy Ho
*Assistant Examiner* — Abdou Seye
(74) *Attorney, Agent, or Firm* — Oliff & Berridge, PLC

(57) ABSTRACT

It is possible to reduce the memory capacity of a buffer of relay connection unit and reduce the time required for deciding a message to be transmitted. A relay connection unit is arranged between bushes to which electronic control units are connected and relays a message transmitted and received between the electronic control units belonging to different bushes. The relay connection unit includes: a buffer which temporarily stores message in the order to receptions; a storage unit which stores the priority set for each of the message; and a processing unit which extracts N message in the order of the receptions from the buffer, reads the priorities of the respective messages extracted from the storage unit, compares the priorities of the N messages, and transmits the message having the highest priority.

4 Claims, 5 Drawing Sheets

| ID | Relay destination | Priority |
|---|---|---|
| 0x001 | Bus31B | 1 |
| 0x003 | Bus31B | 2 |
| 0x004 | Bus31B | 3 |

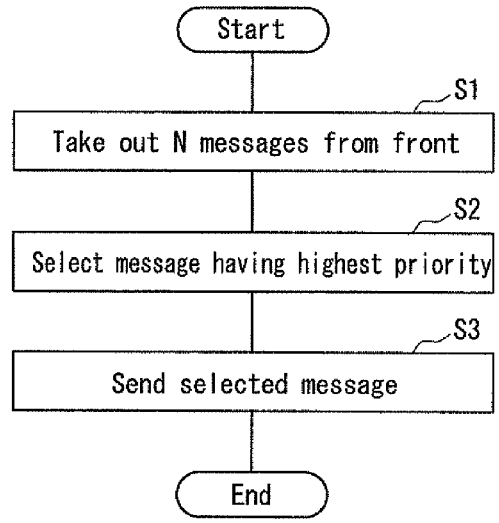
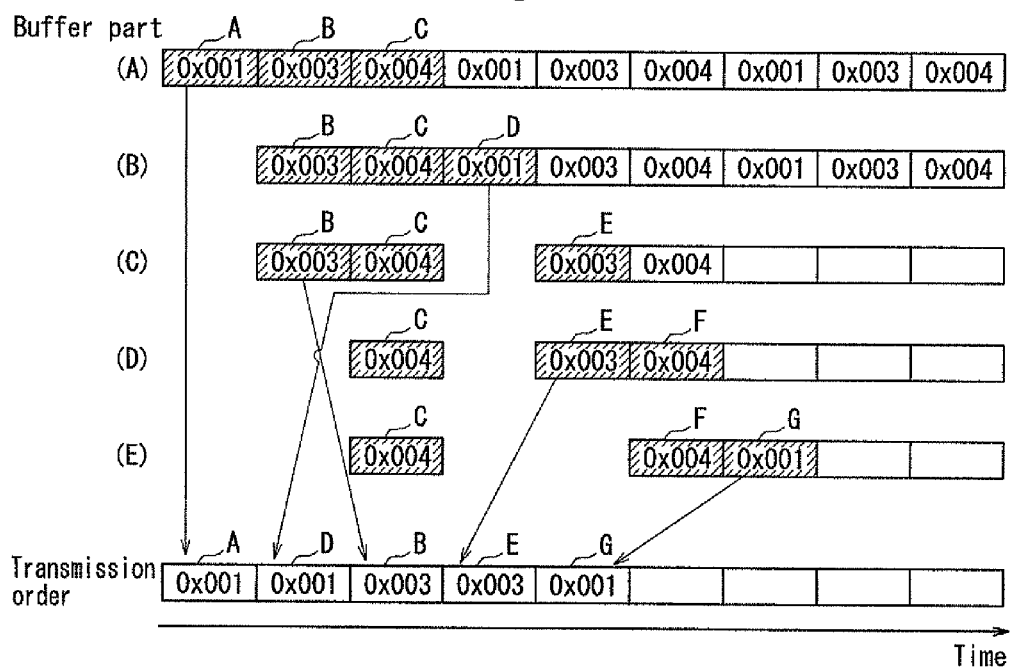

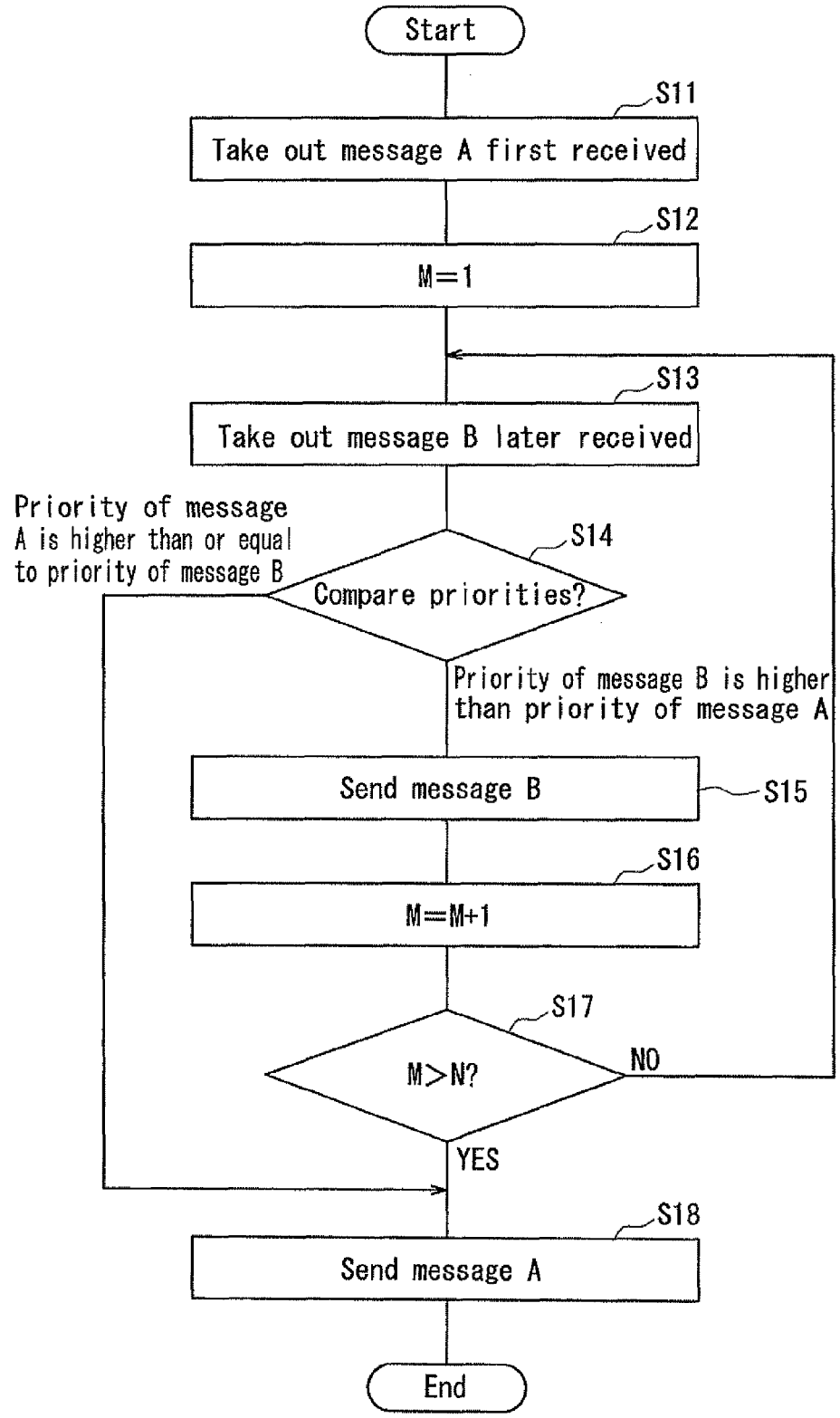

ON-VEHICLE RELAY CONNECTION UNIT

TECHNICAL FIELD

The present invention relates to a relay connection unit to be mounted on a car. More particularly the present invention is intended to decrease the period of time required to rearrange the transmission order of messages.

BACKGROUND ART

In a communication system, to be mounted on a car, which is conventionally adopted, electronic control units (Electronic Control Unit: ECU) controlling the operation of equipment mounted on the car are connected to each other with buses for a multiple communication, and the buses are connected to each other via a relay connection unit (gateway apparatus) so that the relay connection unit relays messages to be sent and received among the ECUs belonging to different buses.

In recent years, as cars have come to have high function and performance, the number of electrical equipments mounted on cars and that of the ECUs controlling operations of the electrical equipment have rapidly increased, and the number of messages sent and received has increased. Therefore when the relay connection unit receives a large number of messages, a problem that it takes time to execute relay processing occurs.

Therefore various methods to be carried out by the relay connection unit in relaying messages from one ECU to other ECUs within a predetermined period of time have been proposed.

For example, in Japanese Patent Application Laid-Open No. 2007-36907 (patent document 1), there is disclosed the construction in which received messages are stored by the buffer part, the transmission order is rearranged based on the priority set for each message, and the stay period of time of the message inside the relay connection unit is detected. A message having a higher priority is sent earlier than a message having a lower priority. Even in the case in which the transmission of a message having the lowest priority has not finished when the predetermined stay period of time has elapsed, the transmission order is fixed till the transmission of the message having the lowest priority finishes.

This construction allows the message having the higher priority to be sent early and the message having the lower priority to be sent within a certain period of time. Further with received messages being stored by one buffer part, the transmission order is rearranged. Thus it is unnecessary to provide the relay connection unit with a plurality of buffer parts.

A relay connection unit having the buffer part provided for each priority has been proposed. Each time a message is received, the priority thereof is found, and received messages are sorted and stored by each buffer part. The relay connection unit first sends a message stored by the buffer part which stores a message having a high priority. Thereby it is possible to prevent the transmission of an important message from being delayed.

In the patent document 1, based on the priority set for each message, the transmission order of all messages stored by the buffer part is rearranged. In deciding the priority based on the ID of each message, when the relay connection unit newly receives a message, the ID of the newly received message is sequentially compared with the ID of each of all messages stored by the buffer part to rearrange the transmission order of the messages.

For example, let it be supposed that the smaller is the ID of a message, the higher is the priority thereof. When the relay connection unit newly receives the message having ID=412 in a state in which the buffer part stores five messages having ID=412, 300, 100, 002, and 200 respectively, to rearrange six messages in order of the ID, it is necessary to execute comparison operations five times to sequentially compare the ID of the newly received message with the ID of each of all messages stored by the buffer part.

Comparison is made five times in the above-described example. But when a large number of messages stay in the buffer part of the relay connection unit, more time is required to rearrange messages. Thus a problem occurs that it takes much time for the relay connection unit to execute relay processing.

In the relay connection unit having the buffer part provided for each priority, it is necessary to provide the relay connection unit with a plurality of buffer parts, which causes a problem that a large memory capacity is necessary.

For example, let it be supposed that the relay connection unit which allows 100 messages to stay therein within a unit time period is designed. In this case, when the number of the buffer parts is one, a memory capacity capable of storing 100 messages suffices. But when the relay connection unit has a buffer memory storing messages having a higher priority and a buffer memory storing messages having a lower priority, it is necessary to assume a worst value such as a case in which 100 messages having only the high priority stay in the buffer part or a case in which 100 messages having only the low priority stay therein. Therefore a memory capacity capable of storing 200 messages is necessary.

Patent document 1: Japanese Patent Application Laid-Open No. 2007-36907

DISCLOSURE OF THE INVENTION

Problem to be Solved by the Invention

The present invention has been made in view of the above-described problems. It is an object of the present invention to provide a relay connection unit in which a buffer part has a small memory capacity and which requires a short period of time in determining a message to be sent.

Means for Solving the Problem

To solve the above-described problem, the present invention provides a relay connection unit, to be mounted on a car, which is interposed between communication lines connecting electronic control units thereto and which relays messages to be sent and received among the ECUs belonging to different communication lines.

The relay connection unit having a buffer part temporarily storing the messages in order of reception; a storing part storing a priority set in advance for each of the messages; and a processing part which takes out N messages stored by the buffer part in order of reception, reads the priority of each of the messages taken out of the storing part, compares the priorities of the N messages with one another, and sends the messages in order of priority.

According to the above-described construction, received messages are all stored by one buffer part in order of reception. To decide the transmission order of messages, initially the processing part takes out N messages from a front message to an Nth message from the buffer part in order of reception to compare the priorities of messages with each other and sequentially sends messages by selecting a message having a higher priority. When there are not less than two messages having an equal priority, a message earlier received is selected.

After the processing part finishes the comparison between the priority of a given message and those of the set N messages, the processing part takes out an (N+1)th message from the buffer part to set the number of messages whose priorities are to be compared with one another to N messages by adding 1 message and N−1 messages which have not been sent as a result of comparison between the priorities and selects a message having the highest priority from among the N messages. By repeating the above-described operations, the processing part rearranges the transmission order of messages.

As described above, the processing part select a message to be sent next not from among all the messages stored in the buffer part, but takes out the N messages from the front message stored in the buffer part and selects the message to be sent next from among the N messages. Therefore it is possible to keep the period of time required to decide the transmission order of the messages constant and thus prevent a long time from elapsing in executing the processing of relaying messages. In addition because received messages are stored by one buffer part, it is possible to decrease the memory capacity of the buffer part.

In the present invention, because the processing part does not rearrange all of a plurality of messages stored in the buffer part at a time, there is a case in which a message having a lower priority is sent earlier than a message having a higher priority. In the present invention, a decrease in the period of time required to rearrange messages by selecting a message having a higher priority from among the N messages from the front of the buffer part is prior to selection of a message having the highest priority from among all messages.

It is favorable that the number of messages whose priorities are compared with each other by the processing part is not less than two nor more than five.

When the number of messages is set to not less than six, it takes long for the processing part to compare the priorities with each other, which reduces the effectiveness of the present invention intended to shorten the period of time required to relay messages. When the number N of messages is 1, the messages are relayed in order of reception. Therefore the number N of the messages is more favorably 3.

It is preferable that the number of messages whose priorities are compared with each other is set to 2 and that the processing part compares a priority of a message earlier received and that of a message later received with each other; compares a lower priority of one of the two messages with a priority of a message received later than the later received message; and sequentially makes such a comparison between priorities for each of predetermined N messages.

According to the above-described construction, all received messages are stored by one buffer part in order of reception. To decide the transmission order of the messages, the processing part compares the priority of a message A earlier received and stored by the buffer part with that of a message B received later than the message A and stored by the buffer part.

When the priority of the message A earlier received is higher than that of the message B later received or the priority of the message A is equal to that of the message B, the processing part sends the message A to the communication line.

When the priority of the message A earlier received is lower than that of the message B later received (when the message A has lost comparison between priorities), the processing part sends the message B later received to the communication line. Thereafter the processing part reads a message C received later than the message B from the buffer part and compares the priority of the message C with that of the message A earlier received. When the message A earlier received has lost the comparison between the priority thereof and that of the message C, comparison is made between the priority of the message A and that of a message received later than the message C. When such a comparison between the priority of the message A and that of the later received messages B, C, . . . continues N times, i.e., when the message A earlier received has lost the comparison between the priority thereof and each of the priorities of later received messages N times, the processing part preferentially sends the message A earlier received.

As described above, when a message to be sent is decided by comparing the priorities of two messages with each other, it is possible to decrease the period of time required to execute processing of relaying messages. By setting the number N of times of comparison between priorities of messages to five times etc. in advance, after the message A earlier received loses the comparison between the priority thereof and each of the priorities of the later received messages N times, the processing part preferentially sends the message A earlier received. Therefore it is possible to prevent the message A earlier received from staying for a long time in the relay connection unit and thus delay in transmission.

In addition because received messages are stored by one buffer part, it is possible to decrease the memory capacity of the buffer part.

Because the processing part does not rearrange all of a plurality of messages stored in the buffer part at a time, there is a case in which a message having a lower priority is sent earlier than a message having a higher priority. In the present invention, the number N of comparison times is set, and the transmission order of messages is rearranged to some extent. Further the priorities of two messages earlier received and later received are compared with each other. Therefore it is possible to make the period of time required to execute processing of determining a message to be sent shorter than the period of time required to do so by rearranging all messages.

It is preferable that the number N of times of comparison between priorities of two messages earlier received and later received is not less than one nor more than five.

By setting the number N of the comparison times to not less than six, when the message earlier received loses repeatedly the comparison between the priority thereof and each of the priority of each of later received messages, the message earlier received stays long in the relay connection unit. Thus the transmission of the message earlier received delays.

EFFECT OF THE INVENTION

As described above, according to the relay connection unit of the present invention, the processing part takes out N messages from the front message stored in the buffer part in the order of reception thereof and selects the message to be sent next from among the N messages. Therefore it is possible to keep the period of time required to decide the transmission order of the messages constant and thus prevent a long time from elapsing in executing the processing of relaying messages.

In addition because received messages are stored by one buffer part, it is possible to decrease the memory capacity of the buffer part.

When a message to be sent is decided by comparing the priorities of two messages earlier received and later received with each other, it is possible to decrease the period of time required to execute processing of relaying messages. By setting the number of messages to be compared with each other to N pieces in advance, after the message A earlier received loses the comparison between the priority thereof and each of the priorities of the later received messages N times, the processing part preferentially sends the message A earlier received. Therefore it is possible to prevent the message A earlier received from staying for a long time in the relay connection unit and thus delay in transmission.

In addition because received messages are stored by one buffer part, it is possible to decrease the memory capacity of the buffer part.

BRIEF DESCRIPTION OF THE DRAWINGS

FIG. 3 is a flowchart showing an operation of a transmission judgment processing part.

FIG. 4 is an explanatory view showing a method of deciding a transmission order by the transmission judgment processing part.

FIG. 7 is a flowchart showing an operation to be performed by a transmission judgment processing part of a second embodiment.

DESCRIPTION OF REFERENCE SYMBOLS AND NUMERALS

Figures 1, 2:
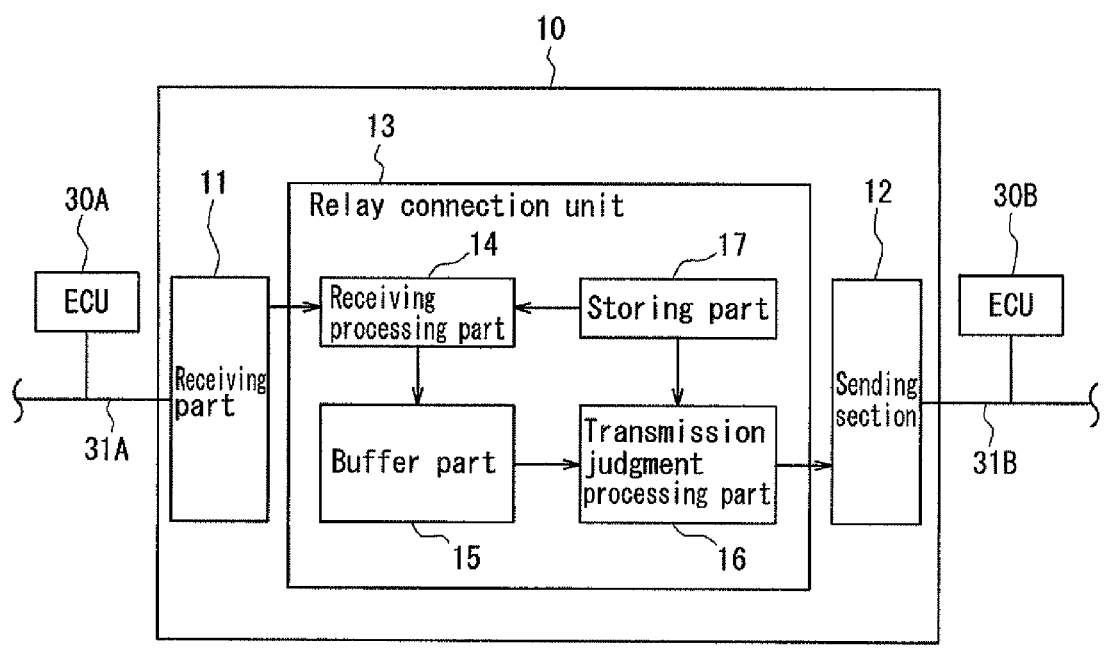
FIG. 1 is a block diagram of a relay connection unit of a first embodiment.
FIG. 2 shows an example of a routing table.

10: relay connection unit
11: receiving section
12: sending section
13: relay processing section
14: receiving processing part
15: buffer part
16: transmission judgment processing part
17: storing part
30 (30A, 30B): electronic control unit (ECU)
31 (31A, 31B): bus
T: routing table
Best Mode for Carrying Out the Invention The embodiments of the present invention are described below with reference to the drawings.

FIGS. 1 through 6 show the first embodiment of the present invention.

A relay connection unit 10, to be mounted on a car, which is interposed between buses 31 connecting an electronic control unit (ECU) 30 thereto and which relays messages sent and received among the ECUs 30 belonging to different buses 31.

In the first embodiment, a communication system is constructed by interposing the relay connection unit 10 between two buses 31A and 31B and by connecting ECUs 30A and 30B to buses 31A and 31B respectively. A communication protocol used is CAN (Controller Area Network).

As shown in FIG. 1, the relay connection unit 10 has a receiving section 11, a sending section 12, and a relay processing section 13.

For the purpose of description, FIG. 1 is a block diagram showing a case where the relay connection unit 10 receives a message from the ECU 30A connected to the bus 31A and sends the message to the bus 31B. Each bus 31 has the receiving section 11 and the sending section 12. But FIG. 1 shows only the receiving section 11 connected to the bus 31A and the sending section 12 connected to the bus 31B.

The receiving section 11 is connected to the bus 31A, thus receiving the message sent from the ECU 30A connected to the bus 31A.

The relay processing section 13 is connected to the receiving section 11 and the sending section 12 and has a receiving processing part 14, a buffer part 15, a transmission judgment processing part 16, and a storing part 17.

The storing part 17 is connected to the receiving processing part 14 and stores a routing table T showing the relationship between an ID (identifier) of a message and the bus 31 to which the message is relayed.

FIG. 2 shows an example of the routing table T. The routing table T shows the bus 31 to which the message is relayed and the priority of the message for the ID thereof. The priority of the message is used by the transmission judgment processing part 16, when the transmission judgment processing part 16 decides a transmission order of the message. The smaller is a numerical value, the higher is the priority. The priority is classified into three stages in the first embodiment. Because a case where a message received from the bus 31A is relayed to the bus 31B is shown in the first embodiment, only the bus 31B is shown as the destination to which the message is relayed.

When the receiving processing part 14 receives a message from the bus 31A via the receiving section 11, the receiving processing part 14 determines whether it is necessary to relay the message to other bus 31 with reference to the routing table T read from the storing part 17. The receiving processing part 14 is connected to the buffer part 15, thus sending a message required to be relayed to the buffer part 15.

The buffer part 15 receives messages required to be relayed from the receiving processing part 14, thus storing the messages from the front in order of reception.

The transmission judgment processing part 16 is connected to the buffer part 15, the sending section 12, and the storing part 17. Of messages stored by the buffer part 15, the transmission judgment processing part 16 takes out N messages from the front message and reads the priority of each message with reference to the routing table T of the storing part 17. The transmission judgment processing part 16 compares the priorities of the N messages with one another, thus first sending a message having the highest priority. The details of the method carried out by the transmission judgment processing part 16 in deciding the transmission order are described later.

The sending section 12 sends messages to the bus 31B in the transmission order set by the transmission judgment processing part 16.

Specifically the receiving processing part 14 and the transmission judgment processing part 16 are composed of a CPU respectively. The storing part 17 and the buffer part 15 are composed of a ROM or a RAM. The receiving section 11 and the sending section 12 are composed of the CAN controller respectively.

The method carried out by the transmission judgment processing part 16 of the relay connection unit 10 in deciding the transmission order is described below.

FIG. 3 is a flowchart showing an operation to be performed by the transmission judgment processing part 16 in selecting a message to be sent next.

At step S1, the transmission judgment processing part 16 takes out N messages from the front message stored in the buffer part 15.

At step S2, the transmission judgment processing part 16 compares the priorities of N messages with one another and selects a message having the highest priority. When there are not less than two messages having the highest priority, the transmission judgment processing part 16 selects a message received first.

At step S3, the transmission judgment processing part 16 sends the message having the highest priority to the bus 31B.

By repeating the above-described operations, the transmission judgment processing part 16 decides the transmission order of messages stored by the buffer part 15.

FIG. 4 is an explanatory view for deciding the transmission order of messages by repeating the operations shown in FIG. 3. FIG. 4 shows a case in which the number N of messages to be taken out of the buffer part 15 by the transmission judgment processing part 16 is three. The buffer part 15 sequentially stores IDs of messages shown in FIG. 4 with a leftmost message at the front.

Initially as shown in FIG. 4(A), the transmission judgment processing part 16 takes out three messages A having ID"0x001", B having ID"0x003", and C having ID"0x004" from the front of the buffer part 15 and compares the priorities of the messages A through C with one another.

At this time, the transmission judgment processing part 16 compares the priorities of the messages A through C with one another, as described below. Initially the transmission judgment processing part 16 compares the priorities of the messages A and B with each other. When the priority of the message A is higher than that of the message B, the transmission judgment processing part 16 compares the priorities of the messages A and C with each other. When the priority of the message A is higher than that of the message C, the transmission judgment processing part 16 determines that the priority of the message A is highest. When the priority of the message C is higher than that of the message A, the transmission judgment processing part 16 determines that the priority of the message C is highest.

When the priority of the message B is higher than that of the message A as a result of comparison between the priorities of the messages A and B, the transmission judgment processing part 16 compares the priorities of the messages B and C with each other. When the priority of the message B is higher than that of the message C, the transmission judgment processing part 16 determines that the priority of the message B is highest. When the priority of the message C is higher than that of the message B, the transmission judgment processing part 16 determines that the priority of the message C is highest.

As shown in FIG. 2, the priority of the message A having ID"0x001" is 1. The priority of the message B having ID"0x003" is 2. The priority of the message C having ID"0x004" is 3. Comparing the priorities of the messages A through C with one another, the priority of the message A is highest. Thus the transmission judgment processing part 16 sends the message A having ID"0x001" first.

Thereafter as shown in FIG. 4(B), the transmission judgment processing part 16 reads a message D having ID"0x001" from the buffer part 15 and compares the priorities of the messages B and C, shown in FIG. 4(A), both of which have not been sent and the priority of the message D with one another. Because the priority of the message D is highest, the transmission judgment processing part 16 first sends the message D having ID"0x001".

Thereafter as shown in FIG. 4(C), the transmission judgment processing part 16 reads a message E having ID"0x003" from the buffer part 15 and compares the priorities of the messages B, C, and E with one another. Because the priority of the messages B and E are highest, the transmission judgment processing part 16 first sends the message B having ID"0x003" received earlier than the message E.

Thereafter as shown in FIG. 4(D), the transmission judgment processing part 16 reads a message F having ID"0x004" from the buffer part 15 and compares the priorities of the messages C, E and F with one another. Because the priority of the message E is highest, the transmission judgment processing part 16 sends the message E having ID"0x003".

Thereafter as shown in FIG. 4(E), the transmission judgment processing part 16 reads a message G having ID"0x001" from the buffer part 15 and compares the priorities of the messages C, F, and G with one another. Because the priority of the message G is highest, the transmission judgment processing part 16 sends the message G having ID"0x001".

By repeating the above-described operations, the transmission judgment processing part 16 decides the transmission order of messages.

An example of the transmission order is shown in FIGS. 5 and 6.

Figure 5A:
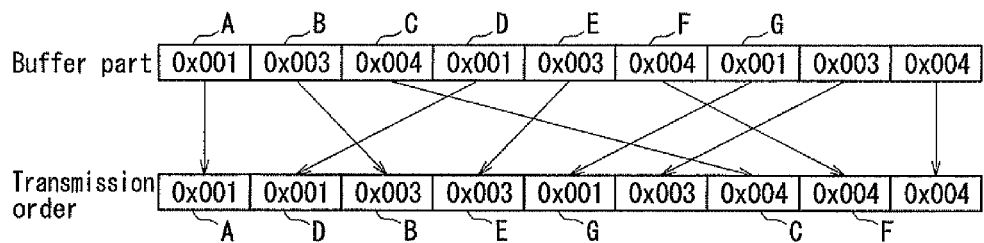
FIGS. 5(A) and 5(B) show an example of a transmission order in which the number N of messages to be compared with one another in the priorities thereof is set to three.

FIG. 5(A) shows a case in which the number N of messages to be compared with one another in the priorities thereof is set to three. Messages stored by the buffer part 15 are the same as those shown in FIG. 4. The transmission judgment processing part 16 sequentially reads messages and sends a message having the highest priority.

Figure 5B:
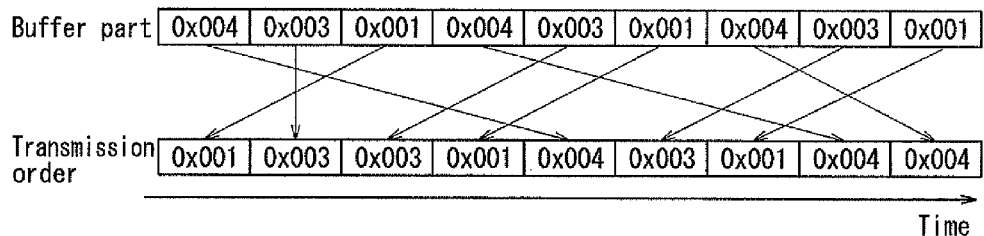

FIG. 5(B) shows another example of the case in which the number N of messages to be compared with one another in the priorities thereof is set to three.

Figure 6A:
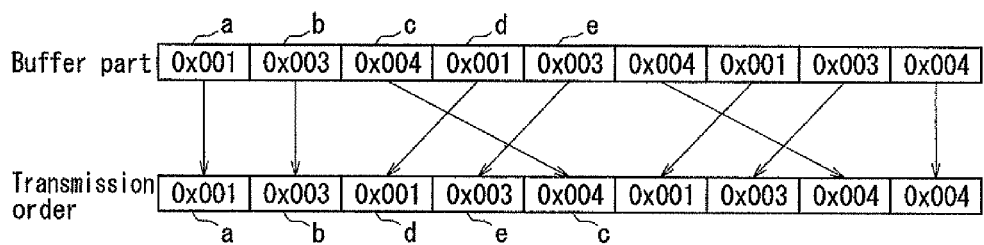
FIGS. 6(A) and 6(B) show an example of a transmission order in which the number N of messages to be compared with one another in the priorities thereof is set to two.

FIG. 6(A) shows a case in which the number N of messages to be compared with one another in the priorities thereof is set to two.

The transmission judgment processing part 16 takes out a message a having ID"0x001" and a message b having ID"0x003" from the buffer part 15. As shown in FIG. 2, the priority of the message a having ID"0x001" is 1, and the priority of the message b having ID"0x003" is 2. Comparing the priorities of the two messages, the priority of the message a having ID"0x001" is higher than that of the message b having ID"0x003". Therefore the transmission judgment processing part 16 sends the front message a having ID"0x001".

Thereafter the transmission judgment processing part 16 compares the priority of the message b having ID"0x003" and that of a next message c having ID"0x004" with each other. Because the priority of the message b having ID"0x003" is higher than that of the message c having ID"0x004", the transmission judgment processing part 16 sends the message b having ID"0x003" as the next transmission order.

Thereafter the transmission judgment processing part 16 compares the priority of the message c having ID"0x004" and that of a next message d having ID"0x001" with each other. Because the priority of the message d having ID"0x001" is higher than that of the message c having ID"0x004", the transmission judgment processing part 16 first sends the message d having ID"0x001".

Thereafter the transmission judgment processing part 16 compares the message c, having ID"0x004", which has lost the comparison and a next message e having ID"0x003" with each other. At this time, because the priority of the message e having ID"0x003" is higher than that of the message c having ID"0x004" the transmission judgment processing part 16 sends the message e having ID"0x003" first.

Thereafter in a manner similar to the above-described manner, the transmission judgment processing part 16 sequentially takes out messages stored in the buffer part 15 in order of reception to compare the priorities of two messages with each other and first sends a message having a higher priority.

Figure 6B:
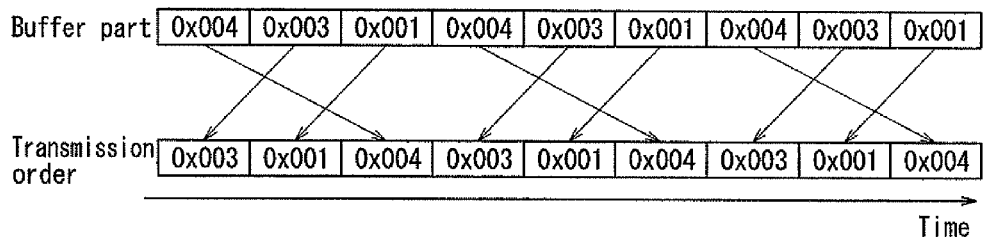

FIG. 6(B) shows another example of the case in which the number N of messages to be compared with one another in the priorities thereof is set to two.

As described above, according to the present invention, the transmission judgment processing part 16 sequentially takes out N messages from the front of the buffer part 15 and selects a message to be sent next from among the N messages. Therefore it is possible to make the time required to decide the transmission order of the messages constant and thus prevent a long time from elapsing in executing the processing of relaying messages.

Because received messages are stored by one buffer part 15, it is possible to decrease the memory capacity of the buffer part 15.

FIGS. 7 through 9 show the second embodiment.

The second embodiment has a construction similar to that of the first embodiment in which the relay connection unit 10 to be mounted on a car is interposed between the buses 31 to which the relay connection unit 10 and the electronic control unit (ECU) 30 are connected and relays messages sent and received among the ECUs 30 belonging to different buses 31. Therefore the description of the construction of the second embodiment is omitted herein.

The second embodiment is different from the first embodiment in the method to be carried out by the transmission judgment processing part 16 in deciding the transmission order.

FIG. 7 is a flowchart showing the operation of the transmission judgment processing part 16.

At step S11, the transmission judgment processing part 16 takes out a first received message A from the buffer part 15.

At step S12, a variable M is set to 1.

At step S13, the transmission judgment processing part 16 takes out a message B received subsequently to the message A from the buffer part 15.

At step S14, the transmission judgment processing part 16 reads the priority of the message A received first and that of the message B received subsequently to the message A from the routing table T of the storing part 17 and compares the priorities thereof with each other. When the priority of the message A received first is higher than that of the message B or the priority of the message A and that of the message B are equal to each other, the transmission judgment processing part 16 determines that the message A has won the comparison between the priorities thereof and goes to step S18. When the priority of the message B is higher than that of the message A, the transmission judgment processing part 16 determines that the message A has lost the comparison between the priorities thereof and goes to step S15.

When the transmission judgment processing part 16 reads the priority of each message from the routing table T, it reads a destination to which each message is to be relayed at the same time.

At step S15, the transmission judgment processing part 16 sends the message B to the bus 31B via the sending section 12. That is, the relay connection unit 10 first sends the message B received later than the message A.

At step S16, 1 is added to the variable M.

At step S17, the transmission judgment processing part 16 compares the number N of comparison times set in advance in the storing part 17 and the value of the variable M with each other. When the number N of the comparison times is smaller than the value of the variable M, the program goes to step S18. When the number N of the comparison times is equal to or larger than the value of the variable M, the program returns to step S13 to read messages received later than the message B and executes processing of comparing the priority of the message B and those of the messages received later than the message B with one another at steps subsequent to step S13.

Examples of the transmission order to be decided by the operations shown in FIG. 7 are described below by using FIGS. 8 and 9.

Figure 8A:
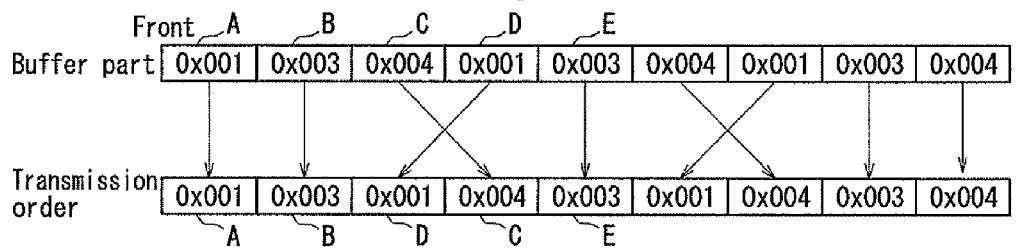
FIGS. 8(A) and 8(B) show a case in which the number N of comparison times is set to one.

FIG. 8 shows a case in which the number N of comparison times is set to 1. Initially, operations of FIG. 8(A) are described below.

The buffer part 15 stores the IDs of messages shown in FIG. 8 in order of reception from the left. The transmission judgment processing part 16 takes out the message A having ID"0x001" earlier received and the message B having ID"0x003" later received from the buffer part 15.

As shown in FIG. 2, the priority of the message A having ID"0x001" is 1. The priority of the message B having ID"0x003" is 2. Comparing the priorities of the two messages with each other, the priority of the earlier received message A having ID"0x001" is higher than that of the message B having ID"0x003". Therefore the transmission judgment processing part 16 sends the earlier received message A having ID"0x001".

Thereafter the transmission judgment processing part 16 compares the priority of the message B having ID"0x003" and that of a message C having ID"0x004" received later than the message B with each other. Because the priority of the message B having ID"0x003" is higher than that of the message C having ID "0x004", the transmission judgment processing part 16 sends the message B having ID"0x003" as the next transmission order.

Thereafter the transmission judgment processing part 16 compares the priority of the message C having ID"0x004" and that of a next message D having ID"0x001" with each other (first comparison). Because the priority of the message D having ID"0x001" is higher than that of the message C having ID"0x004", the transmission judgment processing part 16 first sends the message D having ID"0x001". Because the number N of comparison times is 1 in the example shown in FIG. 8, the transmission judgment processing part 16 does not compare the priority of the message C and that of the message E stored by the buffer part 15 subsequently to the message D with each other, but sends the message C having ID"0x004" subsequently to the message D having ID"0x001".

Thereafter in a manner similar to the above-described manner, the transmission judgment processing part 16 takes out messages stored in the buffer part 15 in order of reception to compare the priorities of messages one time with each other and sends a message having a higher priority.

Figure 8B:
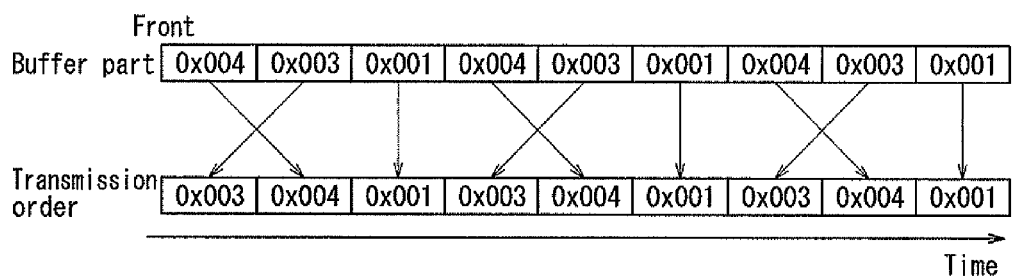

FIG. 8(B) shows another example in which the number N of comparison times is 1.

As in the case of the transmission order shown in FIG. 8, the transmission judgment processing part 16 takes out a message stored in the buffer part 15 in order of reception and makes a comparison one time, and sends a message having a higher priority.

Figure 9A:
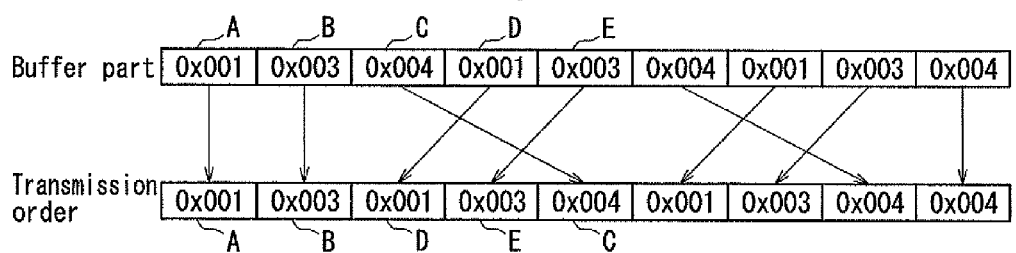
FIGS. 9(A) and 9(B) show a case in which the number N of comparison times is set to two.

FIG. 9(A) shows an example in which the number N of comparison times is 2.

The transmission judgment processing part 16 compares the priority of the message A having ID"0x001" and that of the message B having ID"0x003" with each other similarly to the comparison made in the example shown in FIG. 8(A) and sends the messages A and B in an order similar to that decided in the example shown in FIG. 8(A).

Thereafter the transmission judgment processing part 16 compares the priority of the message C having ID"0x004" and that of a next message D having ID"0x001" with each other (first-time comparison). At this time, because the priority of the message D having ID"0x001" is higher than that of the message C having ID"0x004", the transmission judgment processing part 16 first sends the message D having ID"0x001".

Thereafter the transmission judgment processing part 16 compares the message C having ID"0x004" which has lost the comparison and the message B having ID"0x003" received later than the message C with each other. At this time, because the priority of the message E having ID"0x003" is higher than that of the message C having ID"0x004", the transmission judgment processing part 16 sends the message B having ID"0x003" first. Because the number N of comparison times is 2 in the example shown in FIG. 9(A), the transmission judgment processing part 16 does not make a further comparison, but sends the message C having ID"0x004" subsequently to the message E having ID"0x003".

As described above, when the message A earlier received has lost the comparison between the priority thereof and that of the message B later received, the transmission judgment processing part compares the priority of the message A with that of the message C received later than the message B. When such a comparison between the priority of the message A and that of the later received messages B, C, . . . continues N times, i.e., when the message A earlier received has lost the comparison between the priority thereof and each of the priorities of the later received messages N times, the transmission judgment processing part sends the message A earlier received.

Thereafter in a manner similar to the above-described manner, the transmission judgment processing part 16 sequentially takes out messages stored in the buffer part 15 in order of reception to compare the priority of the earlier received message with those of later received messages two times and first sending a message having a higher priority.

Figure 9B:
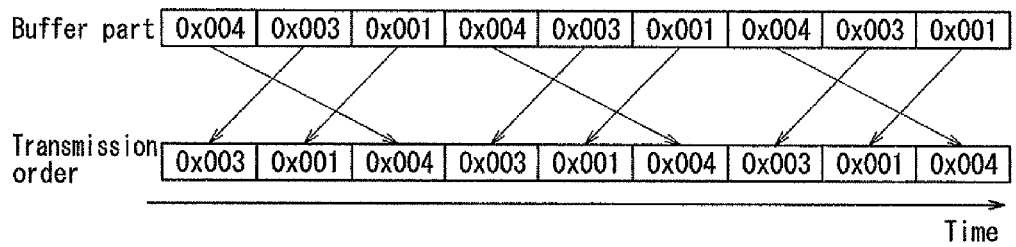

FIG. 9(B) shows an example of the case in which the number N of comparison times is 2. Similarly to the operations to be performed in the example shown in FIG. 9(A), the transmission judgment processing part 16 sequentially takes out messages stored in the buffer part 15 in order of reception to compare the priority of the earlier received message with those of later received messages two times and first sends a message having a higher priority.

As described above, according to the present invention, because received messages are stored by one buffer part 15, it is possible to decrease the memory capacity of the buffer part 15.

Further, two messages earlier received and later received are compared between the priorities thereof. Therefore even though a large number of messages is stored in the buffer part 15, it is possible to keep the period of time required to decide the transmission order of messages constant and prevent a long time from elapsing in executing the processing of relaying messages.

In addition when the message A earlier received has lost the comparison between the priority thereof and those of later received messages N times continuously, the message A is preferentially sent. Therefore it is possible to prevent the earlier received message A from staying for a long time in the relay connection unit 10 and thus delay in transmission.

What is claimed is:

1. A relay connection unit, to be mounted on a car, which is interposed between communication lines connecting electronic control units (ECUs) thereto and which relays messages to be sent and received among said ECUs belonging to different communication lines, said relay connection unit comprising:
   a processor and a memory, the processor programmed to function as:
      a buffer part temporarily storing said messages in order of reception;
      a storing part storing a priority set in advance for each of said messages and a counter M initially set to a value equal to 1; and
      a processing part that:
         takes out N messages stored by said buffer part in order of reception, from a front message to an Nth message,
         reads said priority of each of said N messages taken out of said storing part,
         sequentially compares a priority of the front message with a priority of each of said other N messages in order of reception,
         sends a message of said N messages with the highest priority,
         removes said sent message of said N messages from said buffer part;
      increments variable M by 1; and
         compares the variable M with said N messages.

2. The relay connection unit to be mounted on a car according to claim 1, wherein said N messages whose priorities are compared with each other by said processing part is not less than two nor more than five.

3. The relay connection unit mounted on a car according to claim 1, wherein said processing part compares a priority of a message earlier received and that of a message later received with each other; compares a lower priority of one of two messages with a priority of a message received later than a later received message; and sequentially makes such a comparison between priorities for each of said N messages.

4. The relay connection unit mounted on a car according to claim 1, wherein messages having an equal priority are sent in order of reception.

* * * * *